(12) United States Patent
Jagannatha et al.

(10) Patent No.: US 11,540,196 B2
(45) Date of Patent: Dec. 27, 2022

(54) SYSTEM AND METHOD FOR PROCESSING ENHANCED ROUTE SELECTION DESCRIPTORS

(71) Applicant: Verizon Patent and Licensing Inc., Basking Ridge, NJ (US)

(72) Inventors: Deepa Jagannatha, Bridgewater, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 59 days.

(21) Appl. No.: 17/317,032

(22) Filed: May 11, 2021

(65) Prior Publication Data
US 2022/0369198 A1    Nov. 17, 2022

(51) Int. Cl.
*H04W 40/02* (2009.01)
*H04W 76/10* (2018.01)

(52) U.S. Cl.
CPC ........... *H04W 40/02* (2013.01); *H04W 76/10* (2018.02)

(58) Field of Classification Search
CPC ..... H04W 48/18; H04W 16/14; H04W 40/02; H04W 60/00; H04W 76/10; H04W 76/11; H04W 76/12; H04W 76/15; H04W 4/025; H04W 36/14; H04W 24/02; H04W 40/12; H04W 76/22; H04W 40/248; H04W 60/005; H04W 8/183; H04W 36/0022
See application file for complete search history.

(56) References Cited

U.S. PATENT DOCUMENTS

| | | | | |
|---|---|---|---|---|
| 2020/0120487 A1* | 4/2020 | Tang | ...................... | H04W 48/18 |
| 2020/0359295 A1* | 11/2020 | Huang-Fu | ............. | H04W 80/10 |
| 2021/0105697 A1* | 4/2021 | Xu | ........................ | H04W 88/06 |

OTHER PUBLICATIONS

3GPP TS 23.503 V17.0.0, 3rd Generation Partnership Project; Technical Specification Group Services and System Aspects; Policy and charging control framework for the 5G System (5GS); Stage 2 (Release 17), dated Mar. 2021 (Year: 2021).*
SA WG2 Meeting #138E, S2-2003300 by Intel, dated Apr. 20, 2020 (Year: 2020).*
Technical Specification: 5G; User Equipment (UE) policies for 5G System (5GS); Stage 3 (3GPP TS 24.526 version 15.0.0 Release 15). ETSI TS 124 526 V15.0.0 (Sep. 2018), 40 pages.

* cited by examiner

*Primary Examiner* — Daniel Lai

(57) ABSTRACT

A device includes a memory that stores a User Equipment Route Selection Policy (URSP) that includes a rule. The rule includes enhanced route selection descriptors (RSDs). Each of the enhanced RSDs may include special RSD parameter, such as a Technology selector. The device is configured to receive a request from a component, in the device, to establish a session with a network. The request includes request parameters. The devices processes each of the RSDs.

20 Claims, 11 Drawing Sheets

FIG. 6

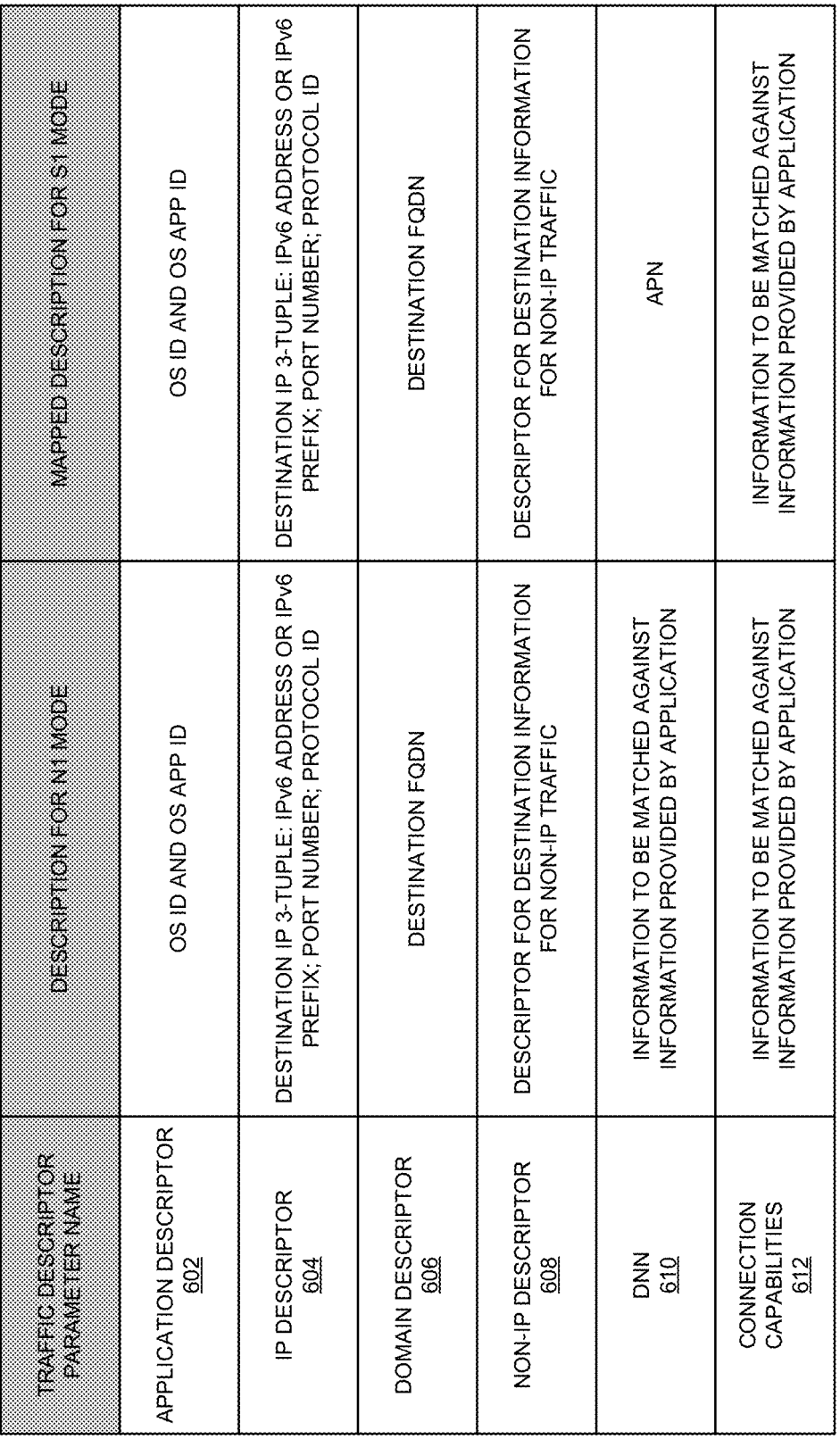

| TRAFFIC DESCRIPTOR PARAMETER NAME | DESCRIPTION FOR N1 MODE | MAPPED DESCRIPTION FOR S1 MODE |
|---|---|---|
| APPLICATION DESCRIPTOR 602 | OS ID AND OS APP ID | OS ID AND OS APP ID |
| IP DESCRIPTOR 604 | DESTINATION IP 3-TUPLE: IPv6 ADDRESS OR IPv6 PREFIX; PORT NUMBER; PROTOCOL ID | DESTINATION IP 3-TUPLE: IPv6 ADDRESS OR IPv6 PREFIX; PORT NUMBER; PROTOCOL ID |
| DOMAIN DESCRIPTOR 606 | DESTINATION FQDN | DESTINATION FQDN |
| NON-IP DESCRIPTOR 608 | DESCRIPTOR FOR DESTINATION INFORMATION FOR NON-IP TRAFFIC | DESCRIPTOR FOR DESTINATION INFORMATION FOR NON-IP TRAFFIC |
| DNN 610 | INFORMATION TO BE MATCHED AGAINST INFORMATION PROVIDED BY APPLICATION | APN |
| CONNECTION CAPABILITIES 612 | INFORMATION TO BE MATCHED AGAINST INFORMATION PROVIDED BY APPLICATION | INFORMATION TO BE MATCHED AGAINST INFORMATION PROVIDED BY APPLICATION |

FIG. 7

| ROUTE SELECTION DESCRIPTOR PARAMETER | DESCRIPTION | MAPPED EPS DESCRIPTION |
|---|---|---|
| TECHNOLOGY SELECTOR 702 | EPC OR 5GC | EPC OR NA |
| SSC MODE SELECTOR 704 | SSC MODE 1, 2, OR 3 | IGNORE OR NA |
| NETWORK SLICE SELECTOR 706 | S-NSSAIs | NA |
| DNN SELECTOR 708 | DNN VALUES | APNS |
| PDU SESSION TYPE SELECTOR 710 | IP, UNSTRUCTURED, OR ETHERNET | IP, NON-IP, ETHERNET |
| NON-SEAMLESS OFFLOAD INDICATION 712 | INDICATES IF THE TRAFFIC IS TO BE OFFLOADED TO NON-3GPP | INDICATES IF THE TRAFFIC IS TO BE OFFLOADED TO NON-3GPP |
| ACCESS TYPE PREFERENCE 714 | 3GPP OR NON-3GPP | 3GPP OR NON-3GPP |
| MULTI-ACCESS PREFERENCE 716 | MULTI-ACCESS OR NON-MULTI-ACCESS | NA |

| PRECEDENCE 802 | TRAFFIC DESCRIPTOR 804 | ROUTE SELECTION DESCRIPTOR 806 |
|---|---|---|
| 1<br>802-1 | APP ID = STREAMING APP | RSD 1: S-NSSAI-A, ENTERPRISE DNN, 3GPP ACCESS<br><br>RSD 2: ENTERPRISE DNN, 3GPP ACCESS |
| 2<br>802-2 | APP ID = IMS VOICE APP | RSD 1: 5GC, IMS DNN, 3GPP ACCESS, SSC MODE 1<br><br>RSD 2: 3GPP ACCESS, IMS DNN |
| 3<br>802-3 | FQDN ID = VIDEO APP | RSD 1: S-NSSAI-B, PERMITTED (WLAN SSID-A) – NON-SEAMLESS OFFLOAD |
| 4<br>802-4 | DNN = ADMIN | RSD 1: 3GPP ACCESS |
| 5<br>802-5 | CONNECTION CAPABILITIES = "IMS" | RSD 1: 3GPP ACCESS, IMS DNN, "IGNORE TECHNOLOGY=EPC" |
| 6<br>802-6 | IP DESCRIPTOR = 192.168.101.24, 50272, 6 | RSD 1: INTERNET DNN, SSC MODE 2 |
| 7<br>802-7 | APP ID = MESSAGING APP | RSD 1: S-NSSAI-C, MULTI-ACCESS<br><br>RSD 2: INTERNET DNN |
| DEFAULT<br>802-8 | WILD CARD | RSD 1: S-NSSAI-B, INTERNET DNN<br><br>RSD 2: INTERNET DNN |

800

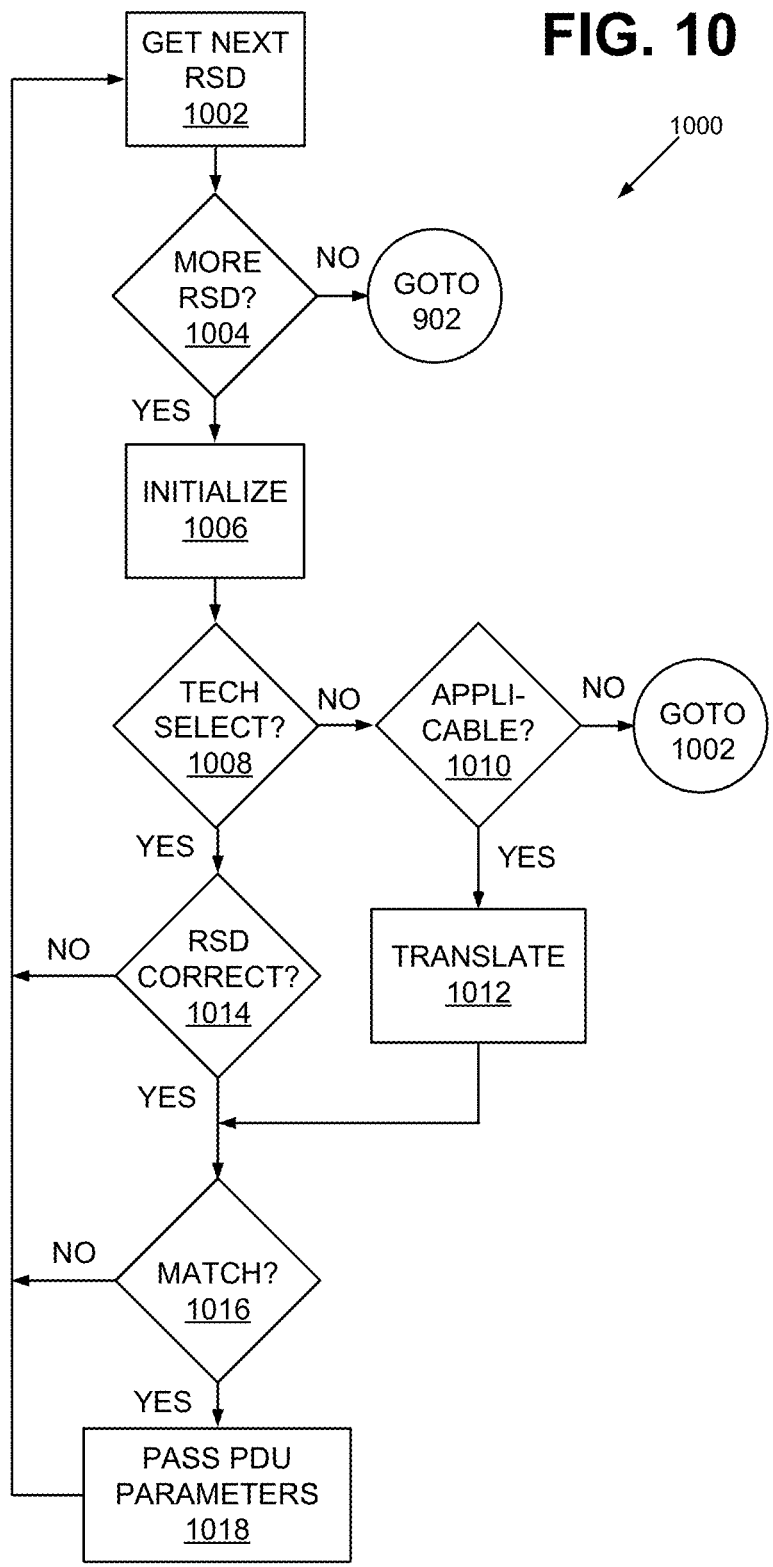

SYSTEM AND METHOD FOR PROCESSING ENHANCED ROUTE SELECTION DESCRIPTORS

BACKGROUND INFORMATION

Advanced wireless networks incorporate many innovative technical features that may not be present in older networks. For example, a Fifth Generation (5G) network may incorporate network slicing technology to increase network efficiency and performance. In contrast, a Long-Term Evolution (LTE) network does not provide native support for network slicing. As another example, a 5G network may provide a mobile device with a User Equipment (UE) Route Selection Policy, to enable the mobile device to access particular services. In contrast, an LTE network provides a mobile device that it serves with Access Point Names (APNs).

BRIEF DESCRIPTION OF THE DRAWINGS

FIG. 6 shows a table of parameters for traffic descriptors (TDs), according to an embodiment;

FIG. 7 shows a table of parameters for enhanced route selection descriptors, (RSDs) according to an embodiment FIG. 8 illustrates an exemplary URSP in a tabular format, according to an embodiment;

FIG. 10 is a flow diagram that is associated with processing enhanced RSDs, according to an embodiment.

DETAILED DESCRIPTION OF EXAMPLE EMBODIMENTS

The following detailed description refers to the accompanying drawings. The same reference numbers in different drawings may identify the same or similar elements.

Figure 1:
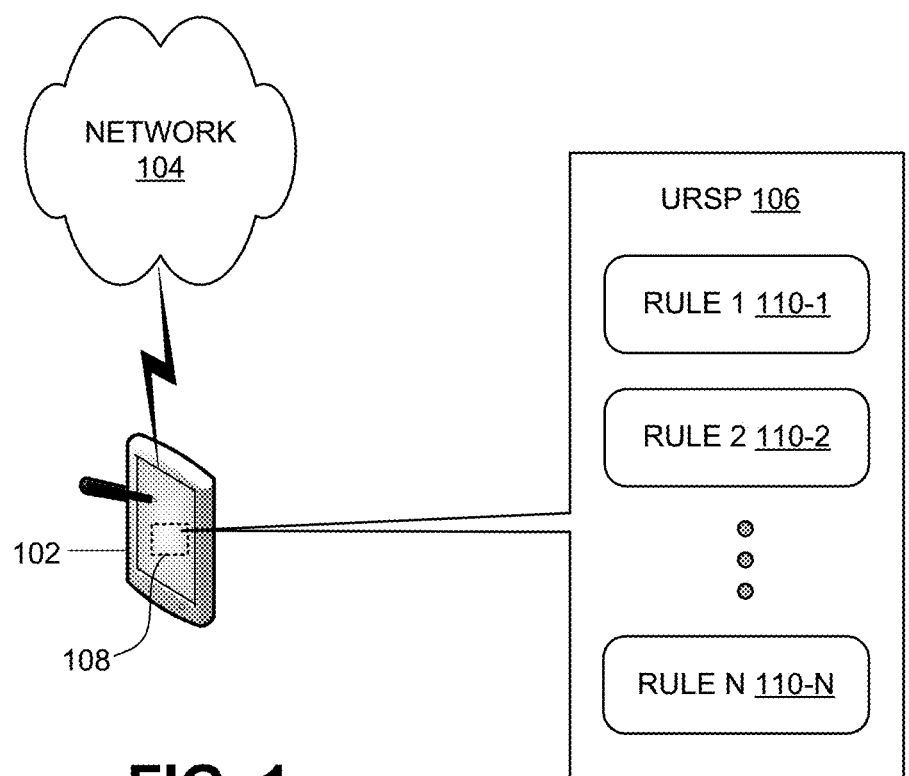
FIG. 1 illustrates an exemplary User Equipment Route Selection Policy (URSP) and exemplary use of the URSP.

Systems and methods described herein relate to processing enhanced Route Selection Descriptors. Route Selection Descriptors (RSDs) are typically part of a URSP. FIG. 1 illustrates an overview of a URSP and its use. Assume that a UE device 102 (referred to herein as UE 102) wishes to receive a video streaming service from network 104. As shown, UE 102 includes a URSP 106 and a URSP processor 108. URSP 106 comprises a series of rules 110-1, 110-2, 110-3 ... and 110-N. When UE 102 attaches to network 104 through a wireless link and an application installed on UE 102 wishes to establish a session with an endpoint in network 104, the application makes a request to URSP processor 108 in UE 102 to establish the session. The request includes information which pertains to the requested session.

URSP processor 108 then applies URSP 106, by selecting a rule, among rules 110-1 through 110-N, that best matches the session information. UE 102 then establishes the session with network 104, using the parameters associated with the rules and the information provided by the request. After the session establishment, URSP processor 108 returns parameters of the session to the application or to another component in its communication layers. For instance, after establishing a session, URSP processor 108 may provide the session handle to its application, so that the application can use the session handle to exchange information with the endpoint in network 104.

In FIG. 1, rule 110 in URSP 106 may include enhanced RSDs. Typically, an RSD includes components herein referred to as selectors or RSD parameters. A selector or an RSD parameter identifies a 5G network-related parameter that may or may not have an LTE or Fourth Generation (4G) network equivalent or an older network equivalent. If network 104 were an LTE network and the session information provided by the application to UE 102 were LTE-related, UE 102 would need to translate all selectors within each of the RSDs in rules 110, prior to applying the rules 110 (to identify a particular rule 110).

When enhanced, an RSD may include a special selector, herein referred to as Technology selector. The Technology selector indicates to what technology the RSD applies (e.g., LTE network, 5G network, etc.). For example, assume that rule 110-1 includes an RSD with the Technology selector and that the session information for network 104 pertains to an LTE service. When UE 102 is evaluating rule 110, UE 102 can avoid applying RSDs that have the Technology selector with the value of 5GC (5G core technology). This simplifies processing URSP 106 for UE 102 when applications request sessions for LTE services.

In addition, enhanced RSDs permit a network operator for network 104 to do less work in enabling UEs 102 to access different types of network services (e.g., LTE and 5G services). A network operator in network 104 can manage routing-related information for both LTE and 5G services provided by network 104, by employing Over-the-Air (OTA) updates to URSP 106. If URSP 106 does not include the enhancement, the network operator would need to ensure that an RSD that pertains to both a 5G service and an LTE service would be correctly interpreted by UE 102 into an LTE equivalent when UE 102 is about to apply the RSD when establishing a session for an LTE service.

Without the enhancement in RSDs, a network operator would need to manage, for the LTE services, Access Point Names (APNs) stored in UEs 102 through its OTA (Over-the-Air) service, apart from managing URSPs in UEs 102. With the enhancement, an APN can be represented by an RSD with the Technology selector having the value "EPC" (e.g., a character string representing the LTE, 4G, etc.). This permits the network operator to administer both APNs for LTE services and URSPs for 5G services, as part of its overall URSP 106 management.

Figure 2:
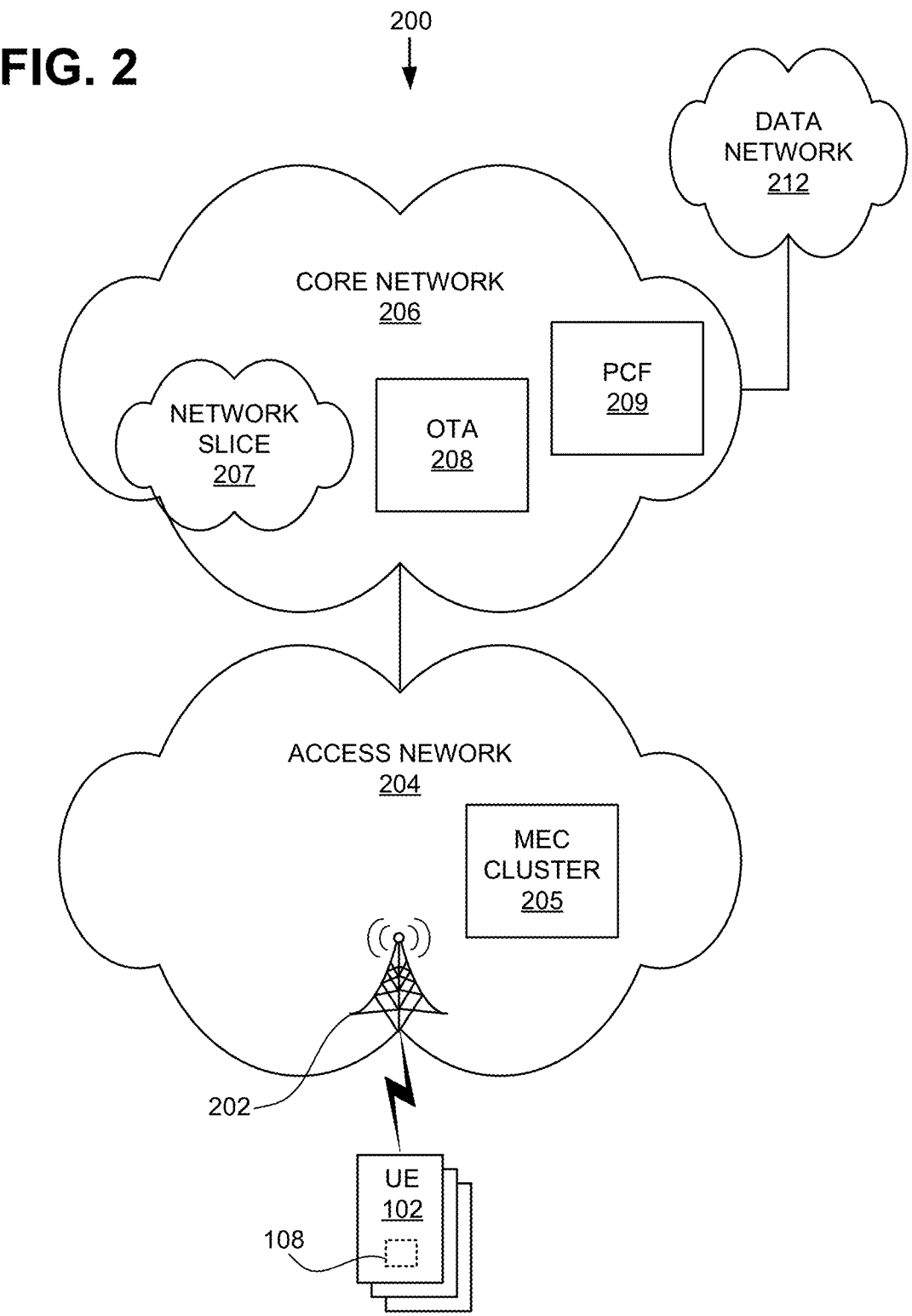
FIG. 2 illustrates an exemplary network environment in which the systems and methods described herein may be implemented.

FIG. 2 illustrates an exemplary network environment 200 in which the system and methods for processing enhanced RSDs may be implemented. As shown, environment 200 may include UE 102 (also UEs 102), an access network 204, a core network 206, and a data network 212. Components of the system for processing enhanced RSDs may reside within UEs 102, access network 204, core network 206, and/or data network 212. The system may enable distribution of URSPs 106 that include enhanced RSDs to UEs 102 as well as processing of the distributed URSPs 106 in UEs 102.

UE 102 may include a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204.

In one implementation, UE 102 may include a URSP processor 108 capable of handling enhanced RSDs. URSP processor 108 may be implemented as hardware or software and may be installed on a communication component, such as a modem within UE 102. Operation of the URSP processor 108 is described in greater detail with reference to FIGS. 4-10. As explained above with reference to FIG. 1, UE 102 includes URSP 106 (not shown in FIG. 2).

Access network 204 may allow UE 102 to access core network 206. To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include an LTE radio network, a 5G radio network and/or another advanced radio network. These radio networks may operate in many different frequency ranges, including millimeter wave (mmWave) frequencies, sub 6 GHz frequencies, and/or other frequencies. Access network 204 may include many wireless stations, one of which is shown as wireless station 202.

Wireless station 202 may include a 4G, 5G, or another type of wireless station (e.g., evolved Node B (eNB), next generation Node B (gNB), etc.) that includes one or more Radio Frequency (RF) transceivers. In some implementations, wireless station 202 may include Integrated Access and Backhaul (IAB) nodes (not shown). Wireless station 202 may establish and maintain an over-the-air channel with UE 102 and backhaul channels with core network 206.

As further shown, access network 204 may include a Multi-Access Edge Computing (MEC) cluster 205. MEC cluster 205 may be located geographically close to wireless stations, and therefore also be close to UEs 102 serviced by the wireless station 202. Due to its proximity to UEs 102, MEC cluster 205 may be capable of providing services to UEs 102 with minimal latency. Depending on the implementations, MEC cluster 205 may provide many core network functions at network edges. In other implementations, MEC cluster 205 may be positioned at other locations (e.g., in core network 206) at which MEC cluster 205 can provide computational resources for improved performance.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 206 may allow the delivery of Internet Protocol (IP) services to UE 102, and may interface with other networks, such as data network 212.

Depending on the implementation, core network 206 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network components.

In FIG. 2, core network 206 is shown as including a network slice 207, an OTA server 208, and a PCF 209. In different embodiments, however, some of these components 207-209 also may be implemented on access network 204 and/or data network 212. Access network 204, core network 206, and data network 212 may include multiple instances of network slice 207, OTA server 208, and PCF 209.

Network slice 207 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice may be configured to meet a different set of requirements and be associated with a particular Quality of Service (QoS) class, a type of service, and/or a particular group of enterprise customers associated with mobile communication devices and/or fixed wireless access (FWA) devices.

Some networks, such as 5G networks, may provide a native support for network slicing, while other types of networks, such as LTE may not. Accordingly, within URSP 106, if a rule 110 includes an RSD that refers to a network slice, UE 102 may not apply the RSD when establishing a session for UE 102 using LTE.

OTA server 208 includes a server for scheduling information to be sent to UE 102 over a wireless link, sending the information to UE 102, and causing UE 102 to store the information within UE 102. The information is then stored at a particular memory device of UE 102 such as a Subscriber Identity Module (SIM), Universal Integrated Circuit Card (UICC), embedded UICC (eUICC), embedded SIM (eSIM), a next generation eUICC, etc.

In one embodiment, a network operator or another network component may use OTA server 208 to download and store an APN, a URSP 106, a URSP update, etc. OTA server 208 causes UE 102 to store the APN, the URSP 106, or the update at a SIM, eSIM, eUICC, etc. In one implementation, OTA server 208 may operate in conjunction with PCF 209 to manage URSP 106 at UE 102 (e.g., store URSP 106, update URSP 106, or remove URSP 106 at UE 102). In in another implementation, OTA server 208 may be used to manage APNs at UE 102 (e.g., store an APN or store an APN at UE 102).

PCF 209 may support policies to control network behavior, provide policy rules to control plane functions (e.g., to an SMF), access subscription information relevant to policy decisions, perform policy decisions, and/or perform other types of processes associated with policy enforcement.

In some implementations, PCF 209 may include components for managing URSPs 106. For example, PCF 209 may receive URSP 106 (or an update to URSP 106) from a network operator or another component in core network 206, access network 204, and/or data network 212. PCF 209 may then prepare the URSP 106, such that its rules 110 comprise RSDs that include an appropriate Technology selector. More specifically, when PCF 209 receives a URSP 106, PCF 209 examines each rule 110 within URSP 106. PCF 209 may determine, for each rule 110, whether the RSDs apply only to a particular technology (e.g., LTE, 5G, etc.), and based on the determination, may insert a Technology selector that indicates whether the RSD is LTE, Next Generation (NG), 5G, etc. By modifying the RSDs, PCF 209 may generate enhanced URSP 106 (also referred to herein simply as URSP 106), PCF 209 may schedule a download of the enhanced URSP 106 or an update to URSP 106 to a particular set of UEs 102.

In one implementation, PCF 209 may manage APNs. For example, a network operator or a network component may provide APNs and/or application/service names to PCF 209. PCF 209 may output RSDs for each APNs that are to be forwarded and/or stored at UE 102. Furthermore, PCF 209 may use the RSDs to create rules 110 and arrange the rules 110 in accordance with their precedence to generate a URSP 106. PCF 209 may enhance the URSP 106 by inserting Technology selectors at particular RSDs within rules 110 of the URSP 106. PCF 209 may schedule with OTA server 208 to forward the enhanced URSP 106 to UE 102.

Data network 212 may include networks that are external to core network 206. In some implementations, data network 212 may include packet data networks, such as an Internet Protocol (IP) network.

For simplicity, FIG. 2 does not show all components that may be included in network environment 200 (e.g., routers, bridges, wireless access point, additional networks, additional UEs 102, wireless station 202, MEC clusters 205, etc.). Depending on the implementation, network environment 200 may include additional, fewer, different, or a different arrangement of components than those illustrated in FIG. 2. Furthermore, in different implementations, the configuration of network environment 200 may be different.

Figure 3:
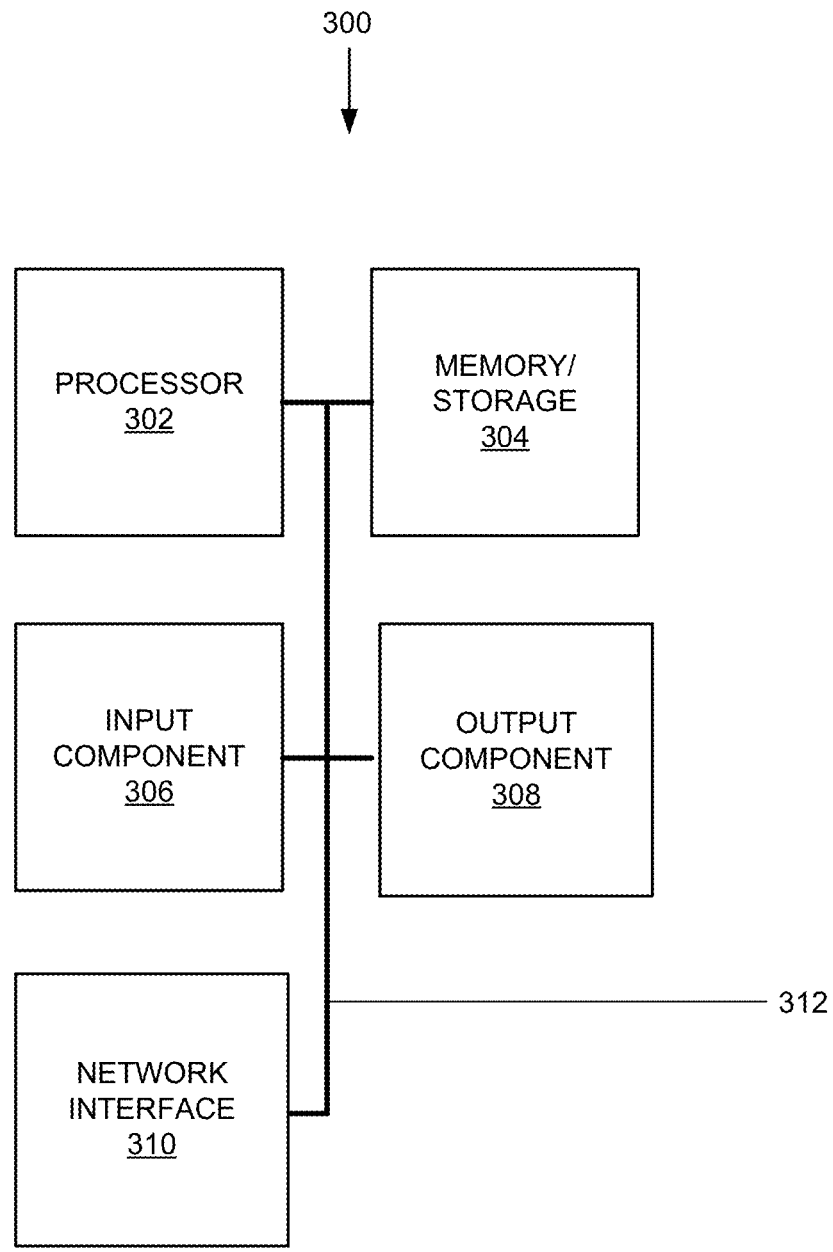
FIG. 3 depicts exemplary components of an exemplary network device, according to an embodiment.

FIG. 3 depicts exemplary components of an exemplary network device 300. Network device 300 corresponds to or is included in UE 102, wireless station 202, MEC cluster 205, OTA server 208, PCF 209 (when PCF 209 is implemented in hardware), and any of the network components of FIGS. 1 and 2 (e.g., a router, a network switch, servers, gateways, etc.). As shown, network device 300 includes a processor 302, memory/storage 304, input component 306, output component 308, network interface 310, and communication path 312. In different implementations, network device 300 may include additional, fewer, different, or a different arrangement of components than the ones illustrated in FIG. 3.

Processor 302 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from network device 300. Input and output components 306 and 308 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 300.

Network interface 310 may include a transceiver (e.g., a transmitter and a receiver) for network device 300 to communicate with other devices and/or systems. For example, via network interface 310, network device 300 may communicate with wireless station 202.

Network interface 310 may include an Ethernet interface to a LAN, and/or an interface/connection for connecting network device 300 to other devices (e.g., a Bluetooth interface). For example, network interface 310 may include a wireless modem for modulation and demodulation.

Communication path 312 may enable components of network device 300 to communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory or storage (e.g., memory/storage 304, when executed by processor 302, may cause processor 302 to perform processes that are described herein. For example, UE 102, OTA server 208, and PCF 209 may each include various programs for performing some of the above-described functions and processes.

Figure 4:
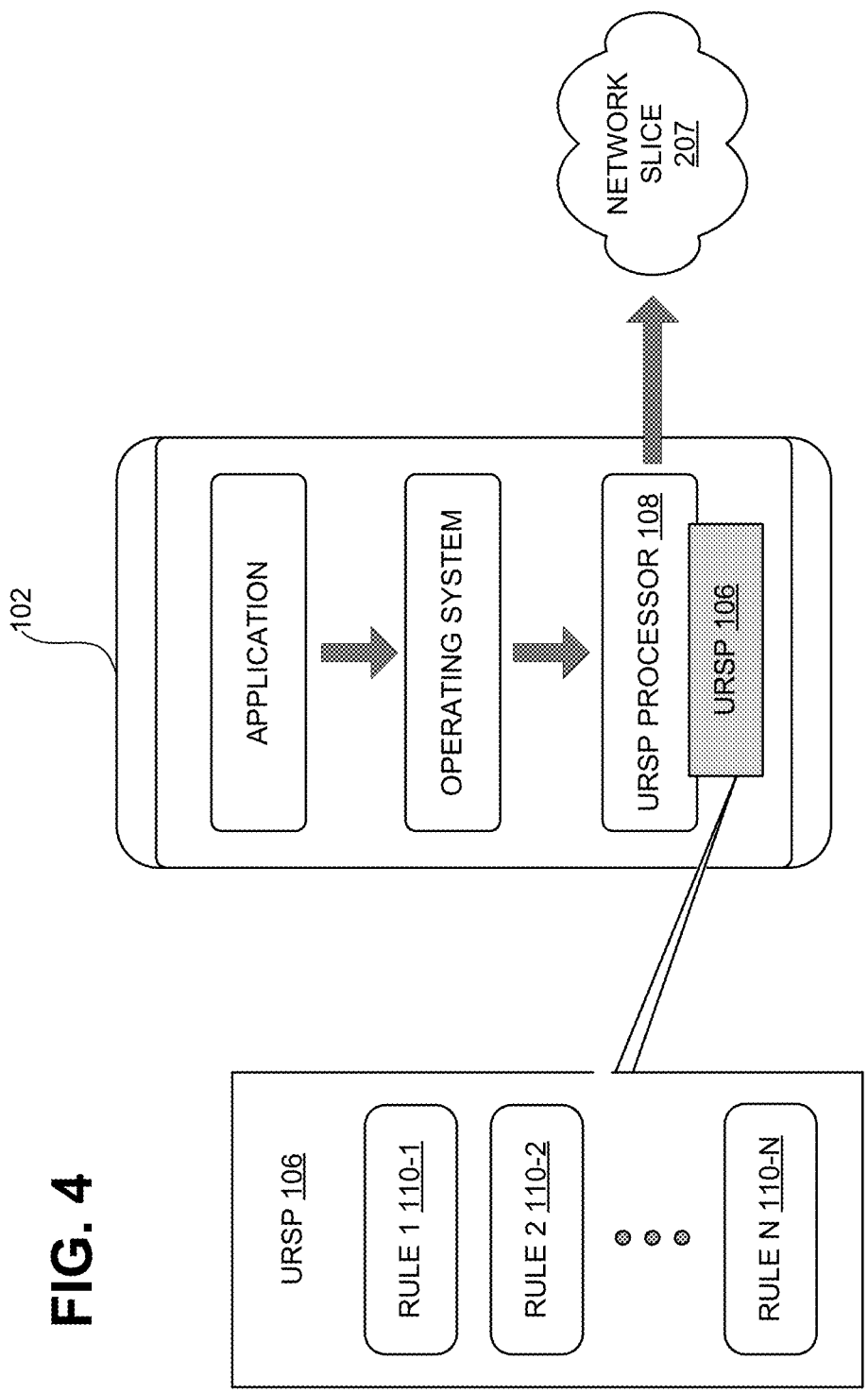
FIG. 4 illustrates a User Equipment (UE) device applying a URSP according to an embodiment.

FIG. 4 illustrates a UE 102 applying URSP 106. As shown, an application installed in UE 102 sends a request via an Operating System (OS) to URSP processor 108 (which may be installed at a modem in UE 102) to establish a session with a server application in network slice 207. To establish the session, URSP processor 108 obtains information such as an application ID, an OS ID, and/or other parameters that URSP processor 108 may use for applying URSP 106. URSP processor 108 retrieves the URSP 106 from a memory (e.g., a SIM, UICC, etc.). As mentioned above, URSP 106 includes a series of rules 110 that are arranged in the order of their precedence. For each rule 110, the modem matches various parameters specified by the rule to the set of parameters provided by the application or obtained locally (e.g., the OS, components in the communication layers of UE 102, etc.). If a rule 110 matches the parameters, URSP processor 108 selects the rule 110. In addition URSP processor 108 either establishes a new session using the parameters or identifies an existing session with the parameters. URSP processor 108 then returns the session parameters to the application or to other components in the communication layers of UE 102.

When URSP processor 108 evaluates URSP 106, URSP processor 108 (and therefore UE 102) may behave differently when UE 102 is in a mode for interfacing with an LTE component (e.g., S1 mode) than when UE 102 is in a mode for interacting with an NG (or a 5G) component (e.g., N1 mode). If UE 102 is in the S1 mode, URSP processor 108 may derive LTE parameters from each rules 110. More specifically, processor 108 may derive the parameters within RSDs, of rules 110, shown in FIGS. 6 and 7. The mapping between the LTE parameters and the parameters of RSDs are also shown in FIGS. 6 and 7. UE 102 may use the derived LTE parameters in the S1 mode to establish its session with the network or identify a current session with the derived parameters.

Figure 5:
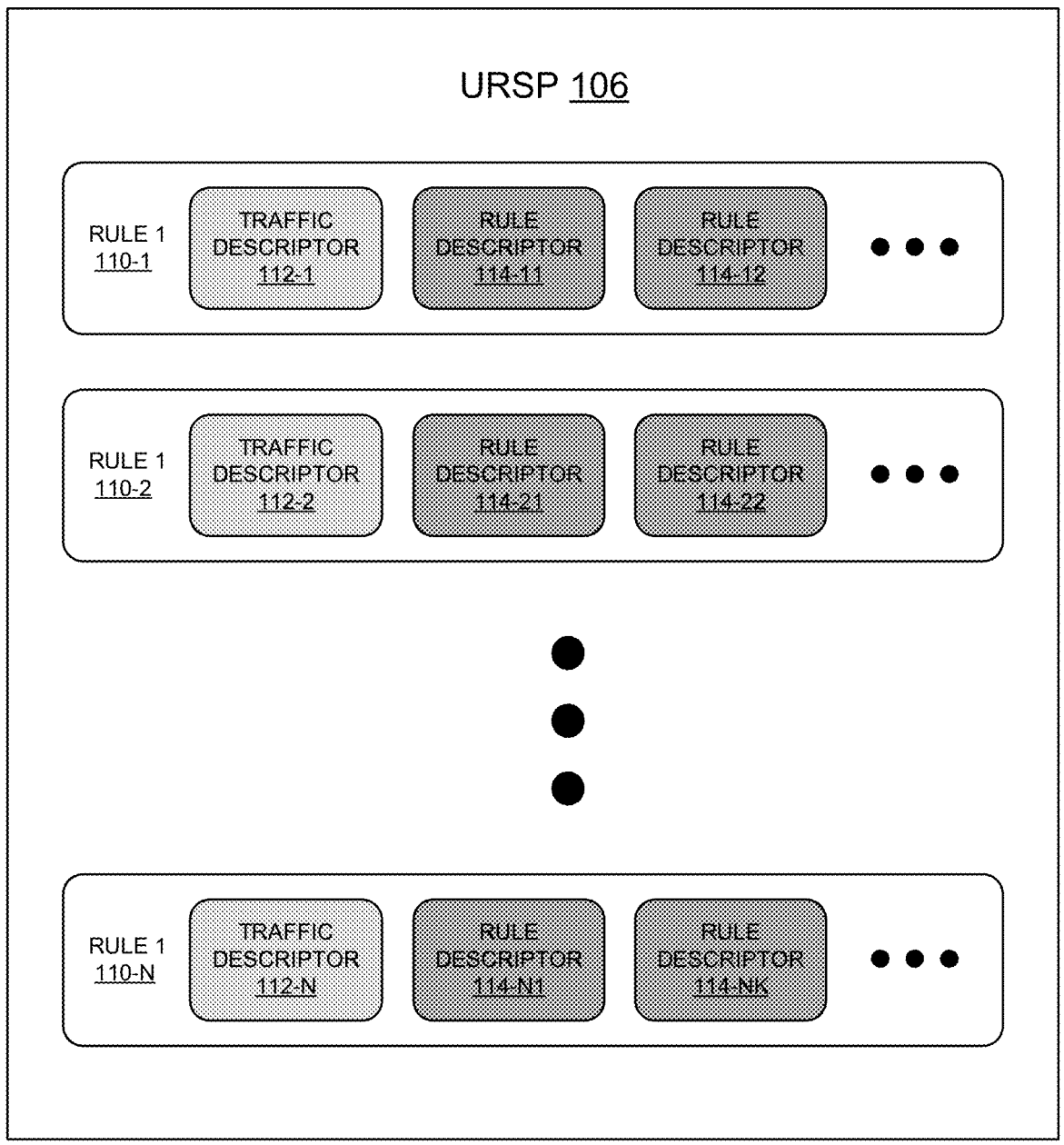
FIG. 5 shows components of a URSP, according to an embodiment.

FIG. 5 shows components of URSP 106. As shown, URSP 106 includes a series of rules 110-1 through 110-N, arranged in the order of their precedence. Thus, for example, UE 102 would attempt to evaluate rule 110-1 before attempting to evaluate rule 110-2, rule 110-2 before rule 110-3, and so on. After a matching rule is found, UE 102 would evaluate the remaining rules 110, except the default rule. Each rule 110 is associated with a precedence value, such that the highest precedence is associated with the lowest precedence value (i.e., a high value indicates lower priority). The last rule 110-N is the default rule.

As further shown, rule 110-1 includes a traffic descriptor (TD) 112-1 and series of RSDs (route selection descriptors) 114-11 through 114-1M (not shown). Other rules 110-2 through 110-N also include TDs 112 and RSDs 114, arranged in a manner similar to rule 110-1. Each instance of TD 112-1, 112-2 . . . 112-N (herein collectively referred to as TDs 112 and generically referred to as TD 112) may be different or same as another TD 112. Each instance of RSD 114 may be different or same as another 114.

FIG. 6 shows a table 600 of parameters for TDs 112. As shown, TD 112 may include one or more of the following parameters: an Application Descriptor 602, an IP Descriptor 604, a Domain Descriptor 606, a Non-TP Descriptor 608, a Data Network Name (DNN) 610, and Connection Capabilities 612. In different implementations, TD 112 may include fewer, additional, or different parameters than those illustrated in FIG. 6.

Application Descriptor 602 may include an identifier that is associated with an operating system (OS ID) and an identifier for an application that runs on the OS (APP ID). The APP ID identifies the application that is to connect with an endpoint in the network. As indicated in table 600, an OS ID and an APP ID for N1 mode, when mapped to S1 mode, remain as the APP ID and the OS ID.

IP Descriptor 604 describes an IP address and other parameters associated with the IP address. IP Descriptor 604 includes a destination IP version 6 (IPv6) address (of the endpoint with which the application wants to establish a connection) or an IPv6 Prefix (i.e., the first 64 bits of the IPv6 address), a port number, and a protocol ID. These parameters, when mapped from the N1 mode to the S1 mode, remain the same. Domain Descriptor 606 includes a fully qualified domain name (FQDN). When translated from N1 to S1 mode, the FQDN remains the same FQDN. Non-IP Descriptor 608 includes descriptor for non-IP traffic destination information. When translated from the N1 mode to the S1 mode, the non-IP Descriptor 608 is the same.

Data Network Name (DNN) 610 includes name/information that is to be compared or matched against endpoint/network information provided by the application on UE 102. For use in the S1 mode, DNN 610 is mapped to an APN. Connection capabilities 612 include connection information to be matched against that provided by the application, in both of the S1 mode and the N1 modes.

FIG. 7 shows a table 700 of parameters for RSDs 114. As shown, RSD 114 may include one or more of the following parameters: a Technology selector 702, a Session Service Continuity (SSC) Mode selector 704, a Network Slice selector 706, a DNN selector 708, a PDU Session Type selector 710, a Non-seamless Offload Indication 712, an Access Type Preference 714, and a Multi-Access Preference 716.

Technology selector 702 may indicate the technology to which other parameters of the RSD applies (e.g., "EPC" or "S1" for Evolved Packet Core, "5GC" or "N1" for 5G packet core). When UE 102 is about to establish a session and is processing an RSD 114, when UE 102 (i.e., URSP processor 108 within UE 102) detects the Technology selector 702 with a value that indicates a technology different from the technology associated with the desired session, UE 102 stops processing the RSD 114 and fetches the RSD with the next lowest precedence value for processing. For example, assume that a URSP rule 1 includes an RSD 1 that comprises DNN selector 708 with the value of "elephant-.net" and Technology selector 702 with the value of "EPC." Assume UE 102 is in the =N1 mode (i.e., UE 102 is attempting to establish a session with the network for an 5G service) and UE 102 scans in the RSD 1. When UE 102 detects the presence of the Technology selector 702 with the value of "EPC," UE 102 stops processing RSD 1 and fetches the RSD with the next lowest precedence value.

SSC Mode selector 704 may indicate a SSC mode. SSC Mode selector 704 may specify one of three possible values: SSC Mode 1, SSC Mode 2, or SSC Mode 3. SSC Mode 1 indicates continuity of a session when UE 102 moves—all of the session parameters are maintained. SSC Mode 2 indicates that the network may break the connection to UE 102 before making a new connection. SSC Mode 3 indicates that a new connection is made to UE 102 before breaking the earlier connection to maintain the service. When translated from the N1 mode to the S1 mode, SSC Mode 1 value is ignored. SSC Mode 2 and SSC Mode 3 values are considered not applicable for the S1 mode, and UE 102 in the S1 mode may deem the entire RSD that includes the SSC Mode value of 2 or 3 not applicable to the session.

Network Slice selector 706 identifies a network slice and may include a Single-Network Slice Selection Assistance Information (S-NSSAI). When UE 102 is in the S1 mode and is evaluating the RSD that includes the Network Slice selector 706, UE 102 would deem the RSD inapplicable for the session. DNN selector 708 may indicate, to UE 102 in the N1 mode, the name of the Data Network (DN). When UE 102 in the S1 mode, UE 102 interprets the value of the DNN selector 708 as an APN.

PDU Session Type selector 710 indicates the type of session to be established or identified. When UE 102 is in the N1 mode, UE 102 may interpret PDU Session Type selector parameter as one of the following: IP, unstructured, or Ethernet. When UE 102 is in the S1 mode, UE 102 translates the value as: be: IP, Non IP, or Ethernet. Non-seamless Offload Indication 712 may indicate if the traffic is to be offloaded to a non-3GPP network, for either the S1 mode or the N1 mode. Access Type Preference 714 indicates whether the network access is 3GPP or non-3GPP, for either the S1 mode or the N1 mode.

Multi-Access Preference 716 indicates whether the preferred mode of access for UE 102 is Multi-access or non-Multi-Access for UE 102 in the N1 mode. For UE 102 in the S1 mode, the presence of Multi-Access Preference 716 renders the RSD containing the Multi-Access Preference 716 inapplicable for the session.

Depending on the implementation, enhanced RSDs may include additional, fewer, or different parameters than those illustrated in table 700 of FIG. 7. For example, the enhanced RSDs 114 may include an Ignore-RSD selector. When an RSD includes an Ignore-RSD selector parameter, which also specifies a condition in which the Ignore-RSD selector applies, the RSD is to be considered inapplicable. UE 102 may continue evaluating the next lower precedence RSD 114 if there are additional RSDs in the rule. An example of Ignore-RSD parameters value is "IGNORE DNN "Technology=EPC." When UE 102 is in the N1 mode and scans the Ignore-RSD and UE 102 stops processing the RSD (i.e., stops evaluating other selectors in the RSD).

FIG. 8 illustrates an exemplary URSP 800 associated with examples of UE 102 processing rules in URSP 800. As shown, URSP 800 includes rules 802-1 through 802-8, organized in the order of their precedence values. Rule 802-1 has the highest precedence and has the lowest precedence value of 1. Rule 802-8 is the default rule and it is deemed to have the highest precedence value (not shown). Each of rules 802 may include enhanced RSDs 112. When UE 102 attempts to establish a session using URSP 800, UE 102 proceeds to compare RSD parameters in each rule 802 to its session parameters. UE 102 begins with rule 802-1 and proceeds to other rules, until a matching rule 802 is found. If no matching rule is found, the default rule is evaluated applied.

In the following, examples of UE 102 processing a particular rule 802 are described. Depending on whether UE 102 that applies URSP 800 is in the N1 mode or the S1 mode, UE 102 may behave differently for each of rules 802-1 through 802-8. Assume for each of the following examples that the TD parameters for the rule 802 matches the session requirement.

Rule 802-1 includes a TD, APP ID. The APP ID is set to STREAMING APP. Rule 802-1 also comprises RSD 1 and RSD 2. As shown, RSD 1 includes: Network Slice selector 706 with the value of S-NSSAI-A, DNN selector 708 with the value of ENTERPRISE DNN, and Access Type Preference 714 with the value of 3GPP ACCESS. RSD 2 of rule 802-1 includes: DNN selector 708 with the value of ENTERPRISE DNN and Access Type Preference 714 with the value of 3GPP ACCESS.

In the N1 mode, during UE 102's evaluation of rule 802-1, when UE 102 scans in RSD 1 and RSD 2, UE 102 determines that all of the parameters in RSD 1 and RSD 2 are applicable to the session. Accordingly, UE 102 applies both RSD 1 and RSD 2. In contrast, when in the S1 mode, during the evaluation of rule 1 802-1, when UE 102 scans in RSD 1, UE 102 determines that the presence of Network Slice selector 706 renders RSD 1 inapplicable and thus proceeds to evaluate RSD 2. If UE 102 determines that RSD 2 matches its session parameters, UE 102 applies RSD 2.

Rule 802-2 includes a TD of APP ID. The APP ID is set to IMS VOICE APP. Rule 802-2 also comprises RSD 1 and RSD 2. Notably, RSD 1 includes: Technology selector 702 with the value of 5GC as well as SSC Mode selector 704 with the value of SSC Mode 1.

For rule 802-2, in the N1 mode, UE 102 determines that the parameters of RSD 1 are applicable to the session and accordingly applies the parameters of RSD 1 to the session. In contrast, when in the S1 mode, when UE 102 scans RSD 1, UE 102 determines that the presence of Technology selector 702 with the value of 5GC indicates that the parameters of RSD 1 are not suited for the session and proceeds to evaluate RSD 2. If the Technology selector 702 were not present, UE 102 would evaluate RSD 2 but ignore the SSC Mode selector 704 (see the above description of SSC Mode selector 704).

For rule 802-3, in the N1 mode, UE 102 evaluates RSD 1. In the S1 mode, however, UE 102 would recognize Network Slice selector 706 with the value of S-NSSAI-B and reject rule 802-3 as inapplicable to the session. As for rule 802-4, UE 102 would fully evaluate RSD 1 in either of the N1 mode and the S1 mode. For rule 802-5, UE 102 fully scans FSD 1, because the "IGNORE-RSD Technology=EPC" indicates that the RSD 1 does not apply only if UE 102 is in the S1 mode. In the S1 mode, when UE 102 detects "IGNORE-RSD Technology=EPC," UE 102 would not apply RSD 1 and move onto the next rule 802-6.

For rule 802-6, when UE 102 is in the N1 mode, UE 102 fully evaluates RSD 1. In the S1 mode, UE 102 does not apply RSD 1, because it includes the SSC Mode selector 704 with the value of SSC mode 2. With respect to rule 802-7, in the N1 mode, UE 102 evaluates RSD 1 but not in the S1 mode—the presence of Network Slice selector 704 and Multi-Access Preference 706 cause UE 102 to stop evaluating RSD 1.

Regarding the default rule 802-8, UE 102 evaluates RSD 1 and RSD 2 in the N1 mode, but only RSD 1 in the S1 mode due to the presence of Network Slice selector 702.

Figure 9:
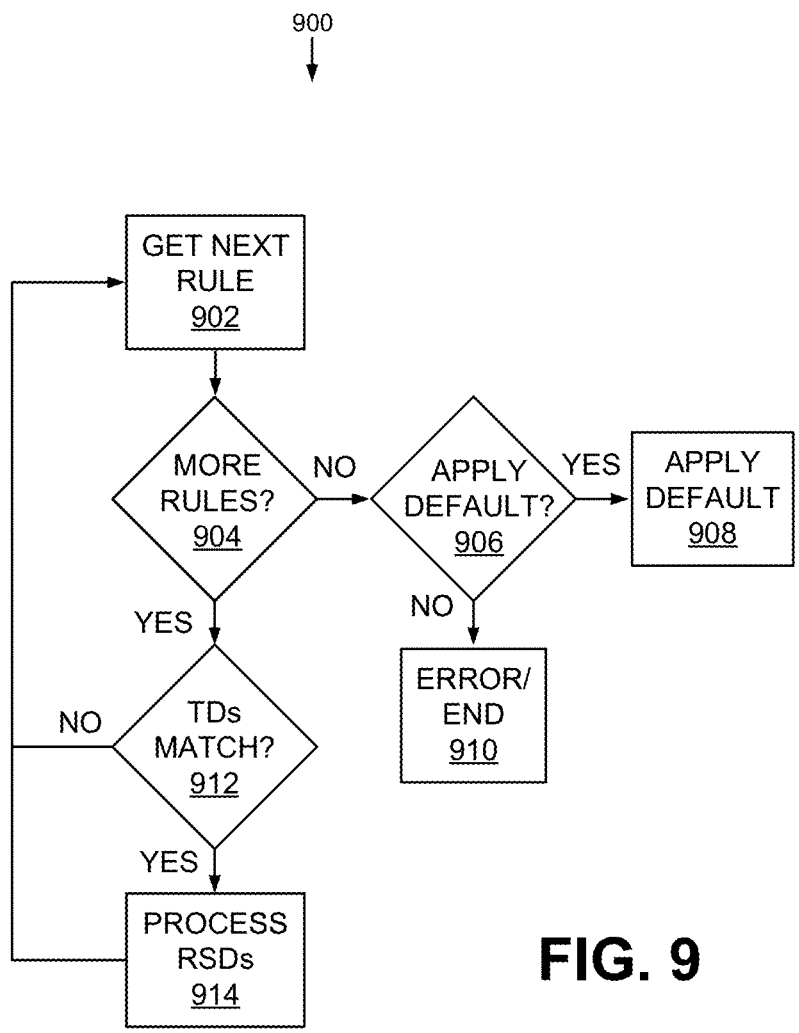
FIG. 9 is a flow diagram that is associated with processing a URSP, according to an embodiment.

FIG. 9 is a flow diagram of an exemplary process 900 that is associated with processing URSP 106. Process 900 may be performed by UE 102 or by UE 102 in combination with one or more components in network environment 200. Assume that an application running on UE 102 has requested, via the OS on UE 102, UE 102 to establish a new session or an existing session with an endpoint in network environment 200. In the request, the application passes all available connection parameters to lower processing layers in UE 102. Also, assume that URSP processor 108 receives the parameters.

As shown, process 900 may include, when URSP processor 108 receives the session request, URSP processor 108 fetching or beginning its procedure for evaluating the "next" rule 110 in URSP 106 (block 902). The next rule 110 is the rule 110 with the lowest precedence value among the remaining rules 110 to be processed in URSP 106. Thus, for example, the next rule 110 may be the first rule in URSP 106, if UE 102 has just begun evaluating URSP 106—since there is no preceding rule. If there are no more rules to be fetched (904: NO), process 900 determines whether a default rule should be applied (block 906). If no rule in URSP 106 has been applied so far, for example, URSP processor 108 determines that the default rule should be applied (block 906: YES) and applies the default rule (block 908). Applying the rule may include processor 108 establishing a new session with its parameters identified by the default rule or locating an existing session with the identified parameters. If the new session can be established or the existing session can be found, processor 108 may return the session parameters to the application or to a different component in UE 102's communication layer. If no session is established or found and thus the default rule is not applied (block 906: NO), then processor 108 may return an error or perform error handling.

Returning to block 904, if there is a next rule to apply (block 904: YES), processor 108 may begin its evaluation/application of the next rule by determining if the TDs of the next rule match the traffic parameters provided in the request (block 912). If the TDs do not match (block 912: NO), process 900 may return to block 902, to determine if there are additional non-default rules to evaluate/apply. Otherwise (block 912: YES), processor 108 may evaluate or process the enhanced RSDs of the rule (block 914). After processing the RSDs, processor 108 may return to block 902, to determine whether there are additional rules in URSP 106.

FIG. 10 is a flow diagram for a process 1000 that is associated with processing enhanced RSDs 114. Process 1000 corresponds to actions in block 914. The flow diagram may not show all actions that URSP processor 108 may take when processing RSDs 114. For process 1000, assume the same conditions as for process 900. As shown, process 1000 may include attempting to get or fetch "next" RSD to be processed (block 1002). As explained above, a rule 110 may include RSDs 114 with different precedence values. The next RSD is the RSD with the next lowest precedence value to be evaluated in the rule 110. If no RSD in the rule was previously applied or evaluated, then the next RSD 114 is the first RSD 114 (i.e., the RSD 114 with the lowest precedence value) in the rule 110.

If no more RSD 114 remains in the rule 110 to be processed (block 1004: NO), process may return to block 902 in process 900 shown in FIG. 9. Otherwise (block 1004: YES), process 1000 may proceed to block 1006, where processor 108 may initialize a number of parameter values (block 1006). For example, processor 108 may store its current technology or service type (e.g., 5G, LTE, etc.).

Process 1000 may further include determining whether one of the RSD parameters is the Technology selector 702 (block 1008). If RSD 114 does not include the Technology selector 702 (block 1008: NO), processor 108 may determine if the RSD 114 is applicable to the current UE 102 mode (i.e., technology) (block 1010). That is, processor 108 may determine whether at least one of the RSD parameters is not applicable to the technology. If the RSD is not applicable (block 1010), processor 108 may stop evaluating the current RSD and process 1000 may return to block 1002.

For example, assume that the RSD 114 includes S-NSSAI. If UE 102 is in the S1 mode, processor 108 may then determine that the RSD 114 is not applicable due to the presence of Network Slice selector 706. In another example, assume that the RSD 114 includes "IGNORE-RSD TECHOLOGY=5GC." If the UE 102's is in the N1 mode, then processor 108 may determine that the RSD 114 is not applicable. In these examples, process 1000 may continue at block 1002.

Returning to block 1010, if the RSD 114 is applicable (block 1010: YES), then processor 108 may translate, if necessary, the parameters specified in the RSD into technology-appropriate parameters (block 1012). For example, assume that UE 102 is in the S1 mode and the RSD 114 specifies the parameters for N1 mode. Processor 102 may derive, from the RSD 114, technology appropriate parameters. Process 1000 may then proceed to block 1016.

Returning to block 1008, if Technology selector 702 is present in the RSD 114 (block 1008: YES), processor 108 may determine whether it is correct to apply the RSD by determining if the technology specified by the Technology selector 702 is consistent with the current UE 102's session mode (block 1014). For example, if UE 102 is in the N1 mode and the Technology selector 702 indicates LTE, then processor 108 may determine that it is not correct to apply the RSD 114 for the requested session. If RSD 114 is not correct (block 1014: NO)), process 1000 may return to block 1002. Otherwise (block 1014: YES), process 1000 may proceed to block 1016.

At block 1016, processor 108 may determine if the RSD parameters (which may have been derived from the RSD 114 by translation at block 1012 or obtained directly from the RSD 114) match those of the requested session (block 1016). If the parameters do not match (block 1016: NO), process 1000 may return to block 1002. Otherwise (block 1016: YES), UE 102 may establish a new session with the session parameters consistent with the RSD parameters or, alternatively, may identify a current session with the parameters consistent with the RSD parameters. Processor 108 may then pass the session parameters to the application or to an upper layer component in the communication layers for UE 102. If UE 102 is unable to locate or establish the session, UE 102 may perform appropriate error-handling procedure (not shown).

Figure 11A:
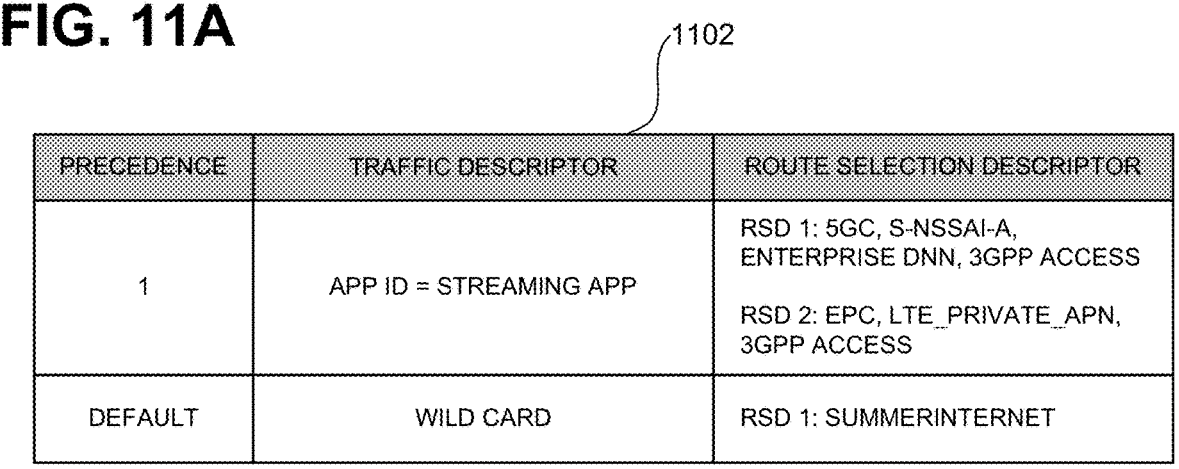
FIGS. 11A-11C illustrate different behaviors of a UE in Fifth Generation (5G) network and a Long-Term Evolution (LTE) network when the UE applies a URSP.
Figure 11B:
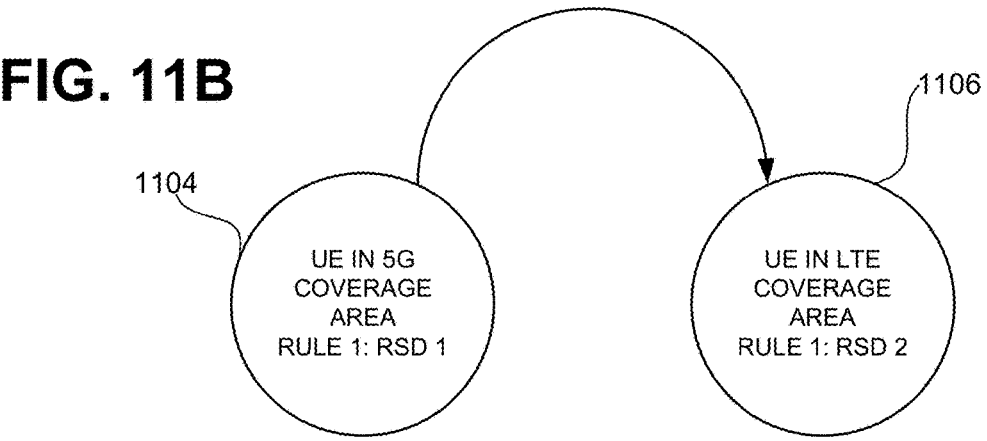
Figure 11C:
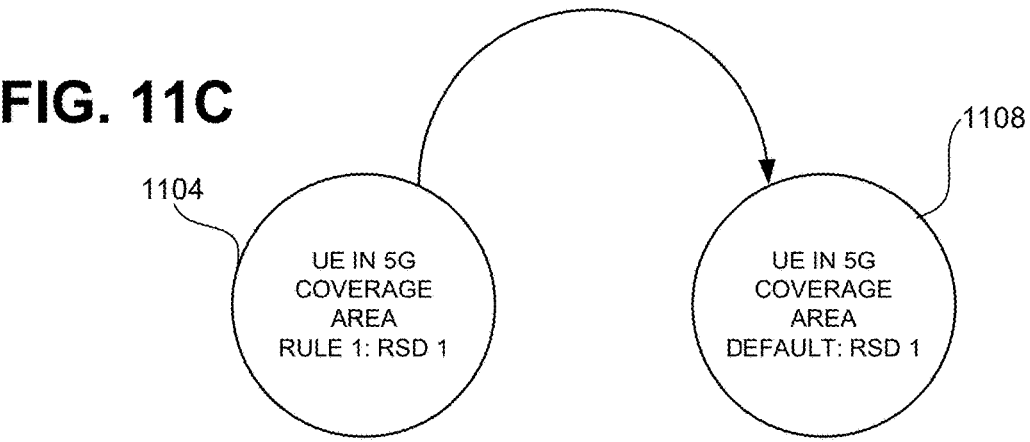

FIGS. 11A-11C illustrate different behaviors of UE 102 in a 5G network and in an LTE network when the UE 102 applies a URSP 902 in accordance with processes 900 and/or 1000. FIG. 11A depicts the contents of URSP 1102 that UE 102 applies during the processes. As shown URSP 1102 includes rule 1 (i.e., a rule with the precedence value of 1), which comprises RSD 1 and RSD 2. RSD 1 has a Technology selector 702 with the value of 5GC, Network Slice selector 706 with the value of S-NSSAI-A, DNN selector 708 with the value of ENTERPRISE, and Access Type Preference 714 with the value of 3GPP. Rule 2 has a Technology selector 702 with the value of EPC, DNN Selector 708 with the value of LTE_PRIVATE_APN, and Access Type Preference 714 with the value of 3GPP.

FIG. 11B illustrates how UE 102 processes URSP 902 when UE 102 is in a coverage area 1104 of a 5G network and when UE 102 is in a coverage area 1106 of an LTE network. As shown, when UE 102 is in coverage area 1104 and UE 102 is about to establish a session, UE 102 evaluates URSP 1102. UE 102 matches the TD 112 of URSP 1102 with that of the application, on UE 102, that has requested the session in the N1 mode. When UE 102 scans RSD 1, UE 102 recognizes that the Technology selector 702 has the value of 5GC and matches the remaining RSD parameters to those for the session. UE 102. UE 102 then provides the session parameters to the application or to a component in its communication layers. UE 102 then continues to scan RSD 2. When UE 102 (which is in N1 mode) sees the Technology selector 702 with the value of EPC, however, UE 102 realizes that RSD 2 does not apply. UE 102 then stops evaluating rule 1 and URSP 106—UE 102 does not apply the default rule in URSP 1102 since rule 1 has been applied.

When UE 102 moves to coverage area 1106, UE 102 enters the S1 mode and then performs a procedure similar to that performed with respect to the session for coverage area 1104. UE applies URSP 1102 to establish a session with the LTE network for coverage area 1106, as UE 102 has the ability to read the URSP parameters while in the S1 (or LTE) mode without being in 5G coverage. When UE 102 scans RSD 1, however, UE 102 sees that the Technology selector 702 has the value of 5GC, and therefore, that RSD 1 is not applicable for its S1 mode. UE 102 proceeds to RSD 2, which includes the Technology selector value of EPC. Accordingly, UE 102 applies RSD 2 to establish the session through the access point with the name LTE_PRI- VATE_APN in the LTE network. UE 102 does not apply the default rule—since rule 1 has been applied to the session.

FIG. 11C illustrates how UE 102 processes URSP 1102 when UE 102 moves from coverage area 1104 to a coverage area 1108 of a 5G network. When UE 102 moves into coverage area 1108, UE 102 enters the N1 mode and performs a procedure similar to that described above for coverage area 1104. Assume for this example that RSD 1 of rule 1 does not match some of the session parameters. Although the Technology selector 702 for RSD 1 is consistent with its session mode (i.e., N1), when UE 102 evaluates all of the parameters in RSD 1, UE 102 recognizes that RSD 1 does not apply. Furthermore, UE 102 sees that RSD 2 does not apply, because RSD 2 includes the Technology selector value of EPC. Accordingly, UE 102 applies its default rule, which provides the DNN selector 708 of SUMMERINTERNET.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the process illustrated in FIGS. 9 and 10, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
    a memory to store a User Equipment Route Selection Policy (URSP) that includes a rule, wherein the rule includes route selection descriptors (RSDs), and wherein each of the RSDs include RSD parameters; and
    a processor configured to:
        receive a request from a component, in the device, to establish a session with a network, wherein the request includes request parameters; and
        process each RSD of the RSDs, wherein when the processor processes each RSD, the processor is further configured to:
            determine if the RSD parameters of the RSD include a Technology selector parameter;
            when the RSD parameters do not include the Technology selector parameter, apply the RSD to establish the session or to identify the session; and
            when the RSD parameters include the Technology selector parameter,
                compare a first technology associated with the session to a second technology specified by the Technology selector;
                when the first technology matches the second technology, apply the RSD either to establish the session or to identify the session; and
                when the first technology does not match the second technology, do not apply the RSD.

2. The device of claim 1, wherein the first technology includes a Fifth Generation (5G) technology and the second technology includes a Long-Term Evolution (LTE) technology.

3. The device of claim 1, wherein the memory includes one or more of:
    a type of Subscriber Identity Module (SIM); or
    a type of Universal Integrated Circuit Card (UICC).

4. The device of claim 1, wherein the processor is further configured to:
    receive, from a Policy Control Function (PCF) in the network, the URSP via an Over-the-Air update.

5. The device of claim 1, wherein the RSD parameters include at least one of:
    a Data Network Name (DNN) selector parameter;
    a Network Slice selector parameter;
    a Service Session Continuity (SSC) selector parameter;
    a Multi-Access Preference parameter;
    a Protocol Data Unit (PDU) Session Type selector parameter;
    a Multi-Access Preference parameter; or
    an Access Type Preference parameter.

6. The device of claim 1, wherein when the RSD parameters include the Technology selector parameter, when the first technology matches the second technology, and when the processor applies the RSD, the processor is further configured to:
    establish the session with the network, wherein one or more parameters for the session are obtained from the RSD parameters and the requested parameters.

7. The device of claim 1, wherein when the RSD parameters include the Technology selector parameter, when the first technology matches the second technology, and when the processor applies the RSD, the processor is further configured to:
    compare one or more of the RSD parameters to the requested parameters.

8. The device of claim 1, wherein the RSDs are arranged in an order of increasing precedence values associated with the RSDs, wherein a low precedence value indicates a high precedence.

9. The device of claim 1, wherein when the RSD parameters do not include the Technology selector parameter and when the processor applies the RSD, the processor is further configured to:
when the session is to be established with the network for a Long-Term Evolution (LTE) service, translate the RSD parameters to corresponding LTE parameters.

10. The device of claim 9, wherein when the processor translates the RSD parameters to the corresponding LTE parameters, the processor maps a data network name (DNN) to an Access Point Name.

11. A method comprising:
storing, in a memory, a User Equipment Route Selection Policy (URSP) that includes a rule, wherein the rule includes route selection descriptors (RSDs), and wherein each of the RSDs include RSD parameters;
receiving a request from a component, in the device, to establish a session with a network, wherein the request includes request parameters; and
processing each RSD of the RSDs, wherein processing each RSD includes:
determining if the RSD parameters of the RSD include a Technology selector parameter;
when the RSD parameters do not include the Technology selector parameter, applying the RSD to establish the session or to identify the session; and
when the RSD parameters include the Technology selector parameter,
comparing a first technology associated with the session to a second technology specified by the Technology selector;
when the first technology matches the second technology, applying the RSD either to establish the session or to identify the session; and
when the first technology does not match the second technology, not applying the RSD.

12. The method of claim 11, wherein the first technology includes a Fifth Generation (5G) technology and the second technology includes a Long-Term Evolution (LTE) technology.

13. The method of claim 11, wherein the memory includes one or more of:
a type of Subscriber Identity Module (SIM); or
a type of Universal Integrated Circuit Card (UICC).

14. The method of claim 11, further comprising:
receiving, from a Policy Control Function (PCF) in the network, the URSP via an Over-the-Air update.

15. The method of claim 11, wherein the RSD parameters include at least one of:
a Data Network Name (DNN) selector parameter;
a Network Slice selector parameter;
a Service Session Continuity (SSC) selector parameter;
a Multi-Access Preference parameter;
a Protocol Data Unit (PDU) Session Type selector parameter;
a Multi-Access Preference parameter; or
an Access Type Preference parameter.

16. The method of claim 11, wherein when the RSD parameters include the Technology selector parameter and when the first technology matches the second technology, applying the RSD comprises:
establishing the session with the network, wherein one or more parameters for the session are obtained from the RSD parameters and the requested parameters.

17. The method of claim 11, wherein when the RSD parameters include the Technology selector parameter, when the first technology matches the second technology, applying the RSD comprises:
comparing one of more of the RSD parameters to the requested parameters.

18. The method of claim 11, wherein the RSDs are arranged in an order of increasing precedence values associated with the RSDs, wherein a low precedence value indicates a high precedence.

19. The method of claim 11, wherein when the RSD parameters do not include the Technology selector parameter, applying the RSD includes:
when the session is to be established with the network for a Long-Term Evolution (LTE) service, translating the RSD parameters to corresponding LTE parameters.

20. A non-transitory computer-readable medium comprising processor-executable instruction, wherein when executed by a processor, the processor-executable instructions cause the processor to:
store, in a memory, a User Equipment Route Selection Policy (URSP) that includes a rule, wherein the rule includes route selection descriptors (RSDs), and wherein each of the RSDs include RSD parameters;
receive a request from a component, in the device, to establish a session with a network, wherein the request includes request parameters; and
process each RSD of the RSDs, wherein when the processor processes each RSD, the processor is configured to:
determine if the RSD parameters of the RSD include a Technology selector parameter;
when the RSD parameters do not include the Technology selector parameter, apply the RSD to establish the session or to identify the session;
when the RSD parameters include the Technology selector parameter,
compare a first technology associated with the session to a second technology specified by the Technology selector;
when the first technology matches the second technology, apply the RSD either to establish the session or to identify the session; and
when the first technology does not match the second technology, do not apply the RSD.

* * * * *